(12) United States Patent (10) Patent No.: US 12,682,208 B2
Kim (45) Date of Patent: Jul. 14, 2026

(54) SYSTEM AND METHOD FOR PERFORMING LAYER OPTIMIZATION OF STACKED RESISTIVE RANDOM-ACCESS MEMORY DEVICE BY USING ARTIFICIAL INTELLIGENCE TECHNOLOGY

(71) Applicant: UNIVERSITY-INDUSTRY COOPERATION GROUP OF KYUNG HEE UNIVERSITY, Yongin-si (KR)

(72) Inventor: Lok Won Kim, Yongin-si (KR)

(73) Assignee: UNIVERSITY-INDUSTRY COOPERATION GROUP OF KYUNG UNIVERSITY, Yongin-si (KR)

( * ) Notice: Subject to any disclaimer, the term of this patent is extended or adjusted under 35 U.S.C. 154(b) by 668 days.

(21) Appl. No.: 18/039,402

(22) PCT Filed: Nov. 30, 2021

(86) PCT No.: PCT/KR2021/017832
§ 371 (c)(1),
(2) Date: Sep. 26, 2023

(87) PCT Pub. No.: WO2022/114913
PCT Pub. Date: Jun. 2, 2022

(65) Prior Publication Data
US 2024/0020511 A1 Jan. 18, 2024

(30) Foreign Application Priority Data
Nov. 30, 2020 (KR) ........................ 10-2020-0163675

(51) Int. Cl.
*G06N 20/00* (2019.01)
*G06N 3/04* (2023.01)

(52) U.S. Cl.
CPC ...................................... *G06N 3/04* (2013.01)

(58) Field of Classification Search
None
See application file for complete search history.

(56) References Cited

U.S. PATENT DOCUMENTS

2020/0097807 A1* 3/2020 Knag ................... G06N 3/0464

FOREIGN PATENT DOCUMENTS

| CN | 110991621 A | 4/2020 |
| CN | 111160534 A | 5/2020 |
| KR | 10-2020-0091785 A | 7/2020 |

OTHER PUBLICATIONS

Xuanyi Dong et al., "Network Pruning via Transformable Architecture Search", 33rd Conference on Neural Information Processing Systems, 2019, 13pgs.

(Continued)

*Primary Examiner* — David R Vincent
(74) *Attorney, Agent, or Firm* — Sughrue Mion, PLLC

(57) ABSTRACT

Provided are a system and a method for performing layer optimization of a stacked resistive random access memory device by using artificial intelligence technology. The method relates to a method using a neural network device for performing layer optimization of a stacked resistive random access memory device by using artificial intelligence technology, and may comprise the steps of: classifying, by the neural network device, binary neural network (BNN) parameters into a physical parameter and a hyper-parameter in a BNN model; obtaining, by the neural network device, an optimal parameter by using the physical parameter and the hyper-parameter; and calculating, by the neural network device, a minimum channel size in the BNN model by using the optimal parameter.

20 Claims, 16 Drawing Sheets

(56) References Cited

OTHER PUBLICATIONS

Bogdan Penkovsky et al., "In-Memory Resistive RAM Implemen-
tation of Binarized Neural Networks for Medical Applications",
arXiv 2006 11595v1, Jun. 2020, 7 pgs.
International Search Report for PCT/KR2021/017832 dated, Mar. 2,
2022 (PCT/ISA/210).

* cited by examiner

1

SYSTEM AND METHOD FOR PERFORMING LAYER OPTIMIZATION OF STACKED RESISTIVE RANDOM-ACCESS MEMORY DEVICE BY USING ARTIFICIAL INTELLIGENCE TECHNOLOGY

CROSS REFERENCE TO RELATED APPLICATIONS

This application is a National Stage of International Application No. PCT/KR2021/017832 filed Nov. 30, 2021, claiming priority based on Korean Patent Application No. 10-2020-0163675 filed Nov. 30, 2020.

TECHNICAL FIELD

The present disclosure relates to a system and method for optimizing layers of a three-dimensional (3D) resistive random-access memory (RRAM) device using artificial intelligence technology. More specifically, the present disclosure relates to a system and method for optimizing layers of a 3D RRAM device using artificial intelligence technology which are intended to acquire an optimal parameter by classifying binary neural network (BNN) model parameters as physical parameters and hyperparameters through a BNN model, calculate a minimum-size channel value having high accuracy and a minimum deviation using the acquired parameter, and optimize layers of a 3D RRAM using the calculated channel value.

BACKGROUND ART

Neuromorphic processors resembling the human nervous system are attracting attention. There have been studies to implement neuromorphic processors by designing neuron circuits and synapse circuits respectively corresponding to neurons and synapses in the human nervous system. Such neuromorphic processors may be used as neural network devices for operating various neural networks, such as a binary neural network (BNN), a convolutional neural network (CNN), a recurrent neural network (RNN), a feedforward neural network (FNN), and the like and used in the field of data classification, image recognition, etc.

With the recent development of neural network technologies, active research is under way to analyze input data and extract valid information using a neural network device in various types of electronic systems.

Neural network devices require a large amount of computation on complex input data. A technology for efficiently processing neural network computation is required for a neural network device to analyze an input in real time and extract information from the input. In particular, low-power high-performance embedded systems, such as smartphones, have limited resources and thus require a technology for minimizing loss of accuracy while reducing the amount of computation required for processing complex input data.

DISCLOSURE

Technical Problem

The present disclosure is directed to providing a system and method for optimizing layers of a three-dimensional (3D) resistive random-access memory (RRAM) device using artificial intelligence technology.

Objectives of the present disclosure are not limited to that described above, and other objectives which have not been described will be understood by those of ordinary skill from the following description.

Technical Solution

One aspect of the present disclosure provides a method of optimizing layers of a three-dimensional (3D) resistive random-access memory (RRAM) device using artificial intelligence technology through a neural network device, the method including classifying, by the neural network device, binary neural network (BNN) parameters of a BNN model as physical parameters and hyperparameters, acquiring, by the neural network device, an optimal parameter using the physical parameters and the hyperparameters, and calculating, by the neural network device, a minimum channel size of the BNN model using the optimal parameter.

The physical parameters may include a number of convolutional layers, a channel (filter) size, a kernel size, whether there is batch normalization, and whether there is a pooling layer, and the hyperparameters may include an optimizer, a learning rate, and a momentum.

The optimizer may include at least one of a batch gradient descent algorithm, a stochastic gradient descent (SGD) algorithm, a gradient descent algorithm, a mini-batch gradient descent algorithm, a momentum algorithm, an adaptive gradients (AdaGrad) algorithm, a root mean squared propagation (RMSprop) algorithm, and an adaptive moment estimation (Adam) algorithm.

The acquiring of the optimal parameter may include calculating an optimal algorithm using the algorithm of the optimizer included in the hyperparameters, calculating an optimal learning rate for adjusting weights in BNN and an intensity of a kernel update using the learning rate included in the hyperparameters, and calculating an optimal momentum by considering a momentum value in the BNN using the momentum included in the hyperparameters.

The calculating of the optimal algorithm may include calculating an optimal algorithm combination of one or more algorithms included in the optimizer and calculating a ratio of the optimal algorithm combination.

In the optimal algorithm, when the kernel size is 3×3, a ratio of the Adam algorithm to the SGD algorithm may be 3:7, and when the kernel size is 5×5, a ratio of the Adam algorithm to the SGD algorithm may be 6:4.

An optimal learning rate of a case of the kernel size being 3×3 and an optimal learning rate of a case of the kernel size being 5×5 may be the same as 0.03.

The optimal momentum may have a momentum value of 0.5 when the kernel size is 3×3, and a momentum value of 0.6 when the kernel size is 5×5.

The acquiring of the optimal parameter may include determining whether there is batch normalization and whether there are pooling layers.

Batch normalization may be included in each of the convolutional layers when the number of convolutional layers is 4, the channel size is 9, and the kernel size is 3×3.

When batch normalization is not included in each of the convolutional layers, there may be an accuracy difference of 8%.

Batch normalization may be performed according to [Equation 1].

$$\hat{x}^{(k)} = \frac{x^{(k)} - \mathbb{E}\left[x^{(k)}\right]}{\sqrt{\operatorname{Var}\left[x^{(k)}\right]}}$$

[Equation 1]

When the number of convolutional layers is 4, the channel size is 9, and the kernel size is 3×3, the pooling layers may be positioned in the last two of the convolutional layers.

The calculating of the minimum channel size may include determining accuracy of the minimum channel size.

When the minimum channel size is 8 and the kernel size is 3×3, the accuracy may be 96% or higher.

The calculating of the minimum channel size may further include determining the accuracy of the minimum channel size by applying a layer-specific error rate according to the minimum channel size.

When the minimum channel size is 8 and the kernel size is 3×3, accuracy at a 40 nm node may be 94.069%, accuracy at a 20 nm node may be 93.777%, and accuracy at a 10 nm node may be 93.07%.

The method may include optimizing, by the neural network device, an RRAM layer having a minimum deviation using the minimum channel size.

Another aspect of the present disclosure provides a system for optimizing layers of a 3D RRAM device using artificial intelligence technology which performs, through a neural network device, a neural network method of optimizing layers of a 3D RRAM device using artificial intelligence technology.

Another aspect of the present disclosure provides a program stored in a computer-readable recording medium to perform the method of optimizing layers of a 3D RRAM device using artificial intelligence technology in combination with a computer which is hardware.

Other details of the present disclosure are included in the detailed description and drawings.

Advantageous Effects

According to the present disclosure, it is possible to optimize layers of a three-dimensional (3D) resistive random-access memory (RRAM) using artificial intelligence technology. In other words, since the size of a 3D weight matrix is minimized, the present disclosure may be useful for a hardware processor using an RRAM synapse.

The present disclosure can be applied to drones, robot devices such as an advanced drivers assistance system (ADAS) and the like, smart televisions (TVs), smartphones, medical devices, mobile devices, image display devices, measurement devices, Internet of things (IoT) devices, etc. In addition, the present disclosure can be applied to various electronic devices so that a high-quality service can be provided to various users.

Effects of the present disclosure are not limited to those described above, and other objectives which have not been described will be understood by those of ordinary skill from the following description.

MODES OF THE INVENTION

Figure 1:
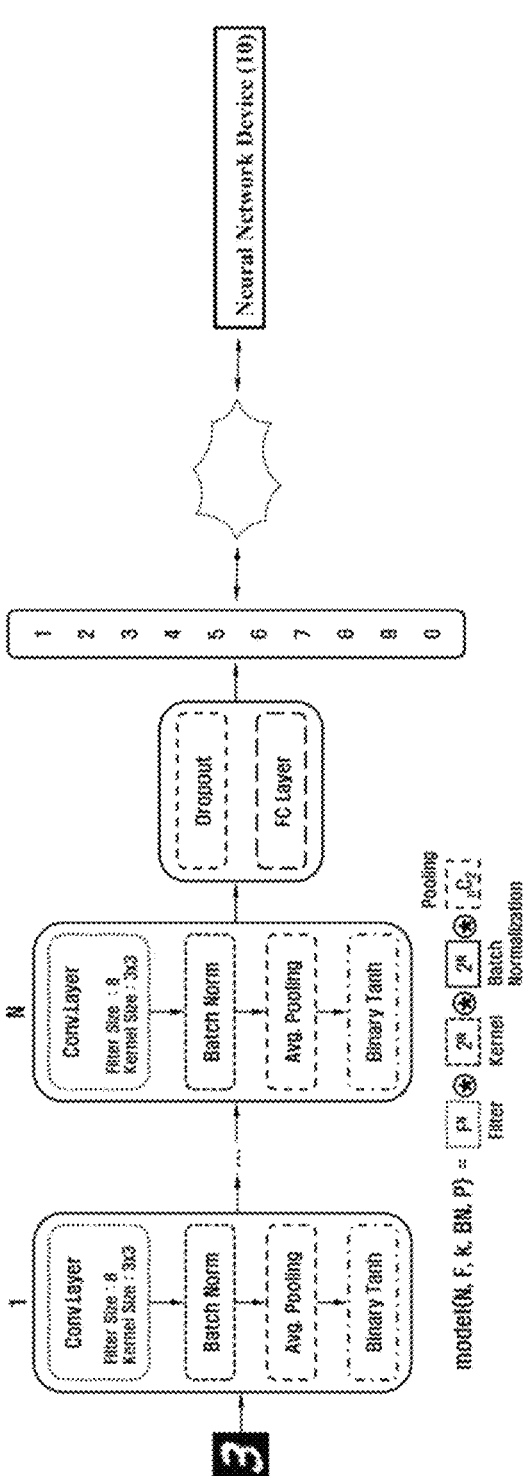
FIG. 1 is a conceptual diagram illustrating a system for optimizing layers of a three-dimensional (3D) resistive random-access memory (RRAM) device using artificial intelligence technology according to an embodiment of the present disclosure.

Advantages and features of the present disclosure and methods of achieving the same will become apparent through embodiments described in detail below with reference to the accompanying drawings. However, the present disclosure is not limited to the embodiments set forth herein and may be implemented in various different forms. Rather, the embodiments are provided to make the present disclosure complete and fully convey the scope of the present disclosure to those skilled in the technical field to which the present disclosure pertains. The present disclosure is only defined by the claims.

Terminology used herein is for the purpose of describing embodiments and is not intended to limit the present disclosure.

In this specification, the singular forms include the plural forms unless the context clearly indicates otherwise. As used herein, the terms "comprises" and/or "comprising" do not preclude the presence or addition of one or more components other than stated components.

Throughout the specification, like reference numerals refer to like components, and the term "and/or" includes each and any combination of stated components.

Although terms such as "first," "second," and the like are used to describe various components, these components are not limited by these terms. Rather, these terms are only used to distinguish one component from another. Therefore, a first component described below may also be a second component without departing from the technical scope of the present invention.

Unless otherwise defined, all terms (including technical and scientific terms) used herein have the same meaning as commonly used by those skilled in the technical field to which the present disclosure pertains. Terms defined in commonly used dictionaries are not interpreted in an idealized or overly formal sense unless expressly so defined herein.

Hereinafter, embodiments of the present disclosure will be described with reference to the accompanying drawings.

FIG. 1 is a conceptual diagram illustrating a system for optimizing layers of a three-dimensional (3D) resistive random-access memory (RRAM) device using artificial intelligence technology according to an embodiment of the present disclosure.

As shown in FIG. 1, a system 1 for optimizing layers of a 3D RRAM device using artificial intelligence technology may optimize parameters of a binary neural network (BNN) model to minimize the filter size of a BNN model through a neural network device 10.

Operations of the system 1 for optimizing layers of a 3D RRAM device using artificial intelligence technology according to an embodiment of the present disclosure will be described below with reference to FIGS. 2 to 15.

Figure 2:
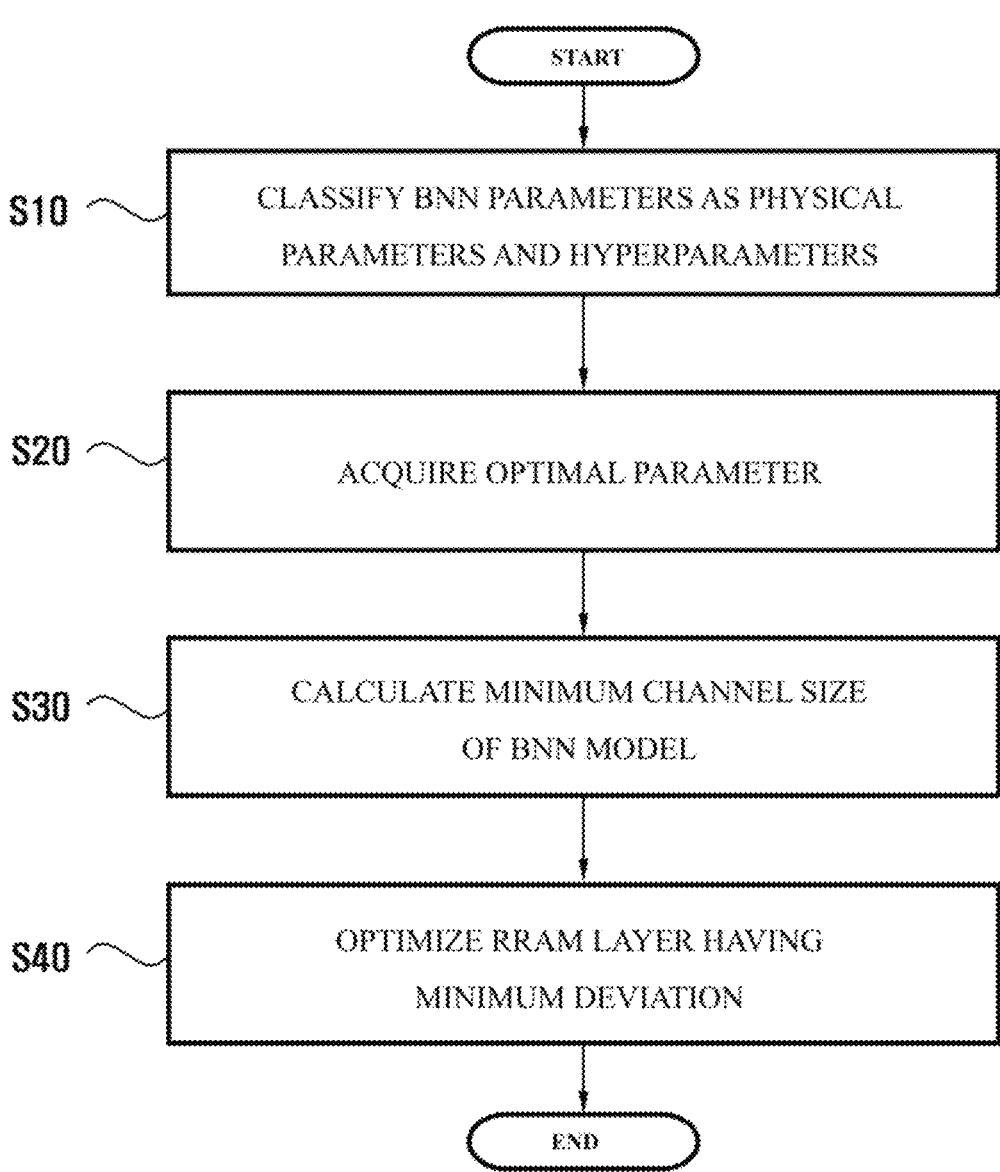
FIG. 2 is a flowchart illustrating a method of optimizing layers of a 3D RRAM device using artificial intelligence technology according to an embodiment of the present disclosure.
Figure 3:
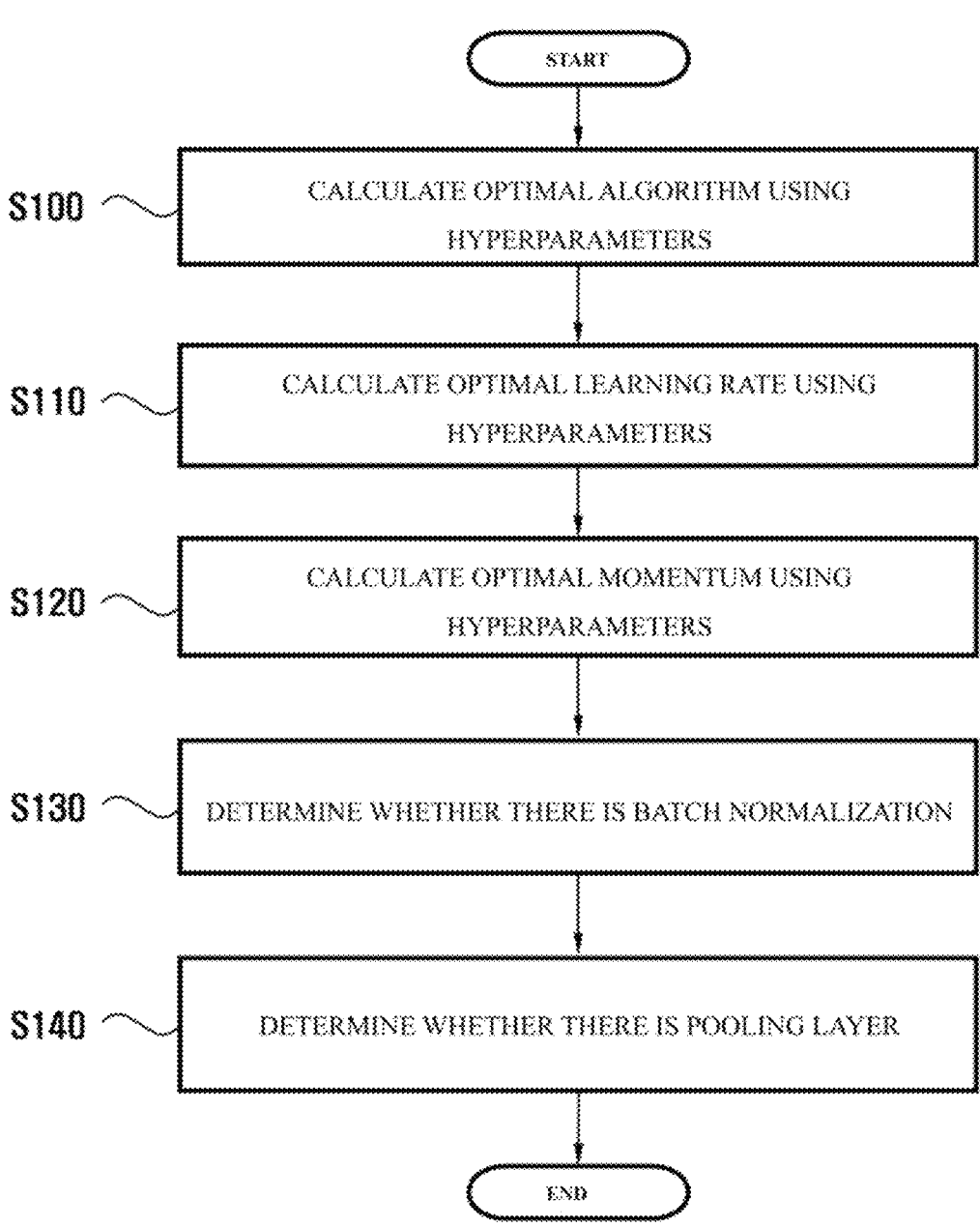
FIG. 3 is a flowchart illustrating an operation of acquiring an optimal parameter shown in FIG. 2.
Figure 4:
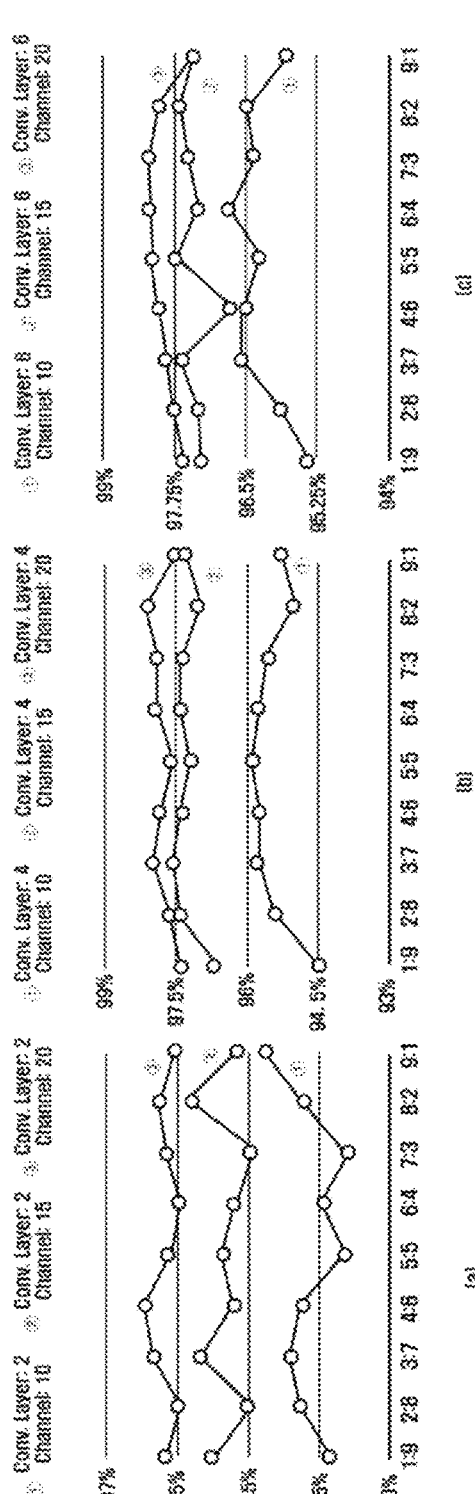
FIGS. 4 and 5 are sets of graphs illustrating an operation of calculating an optimal algorithm combination shown in FIG. 3.
Figure 5:
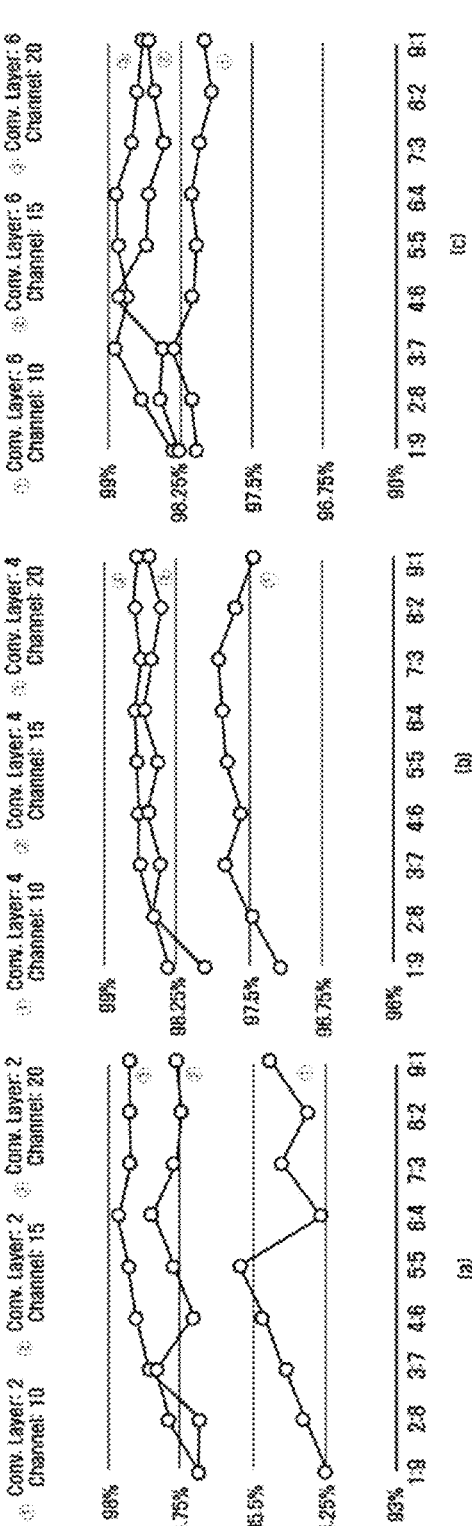
Figure 6:
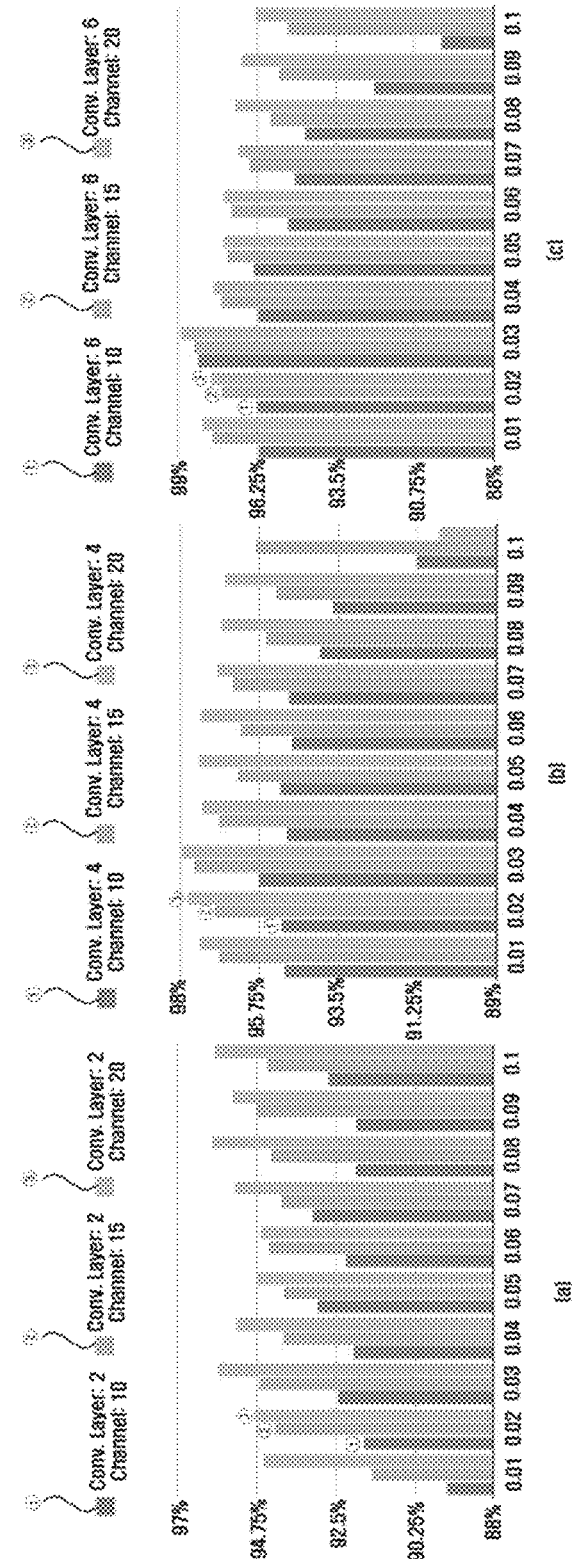
FIGS. 6 and 7 are sets of graphs illustrating an operation of calculating an optimal learning rate shown in FIG. 3.
Figure 7:
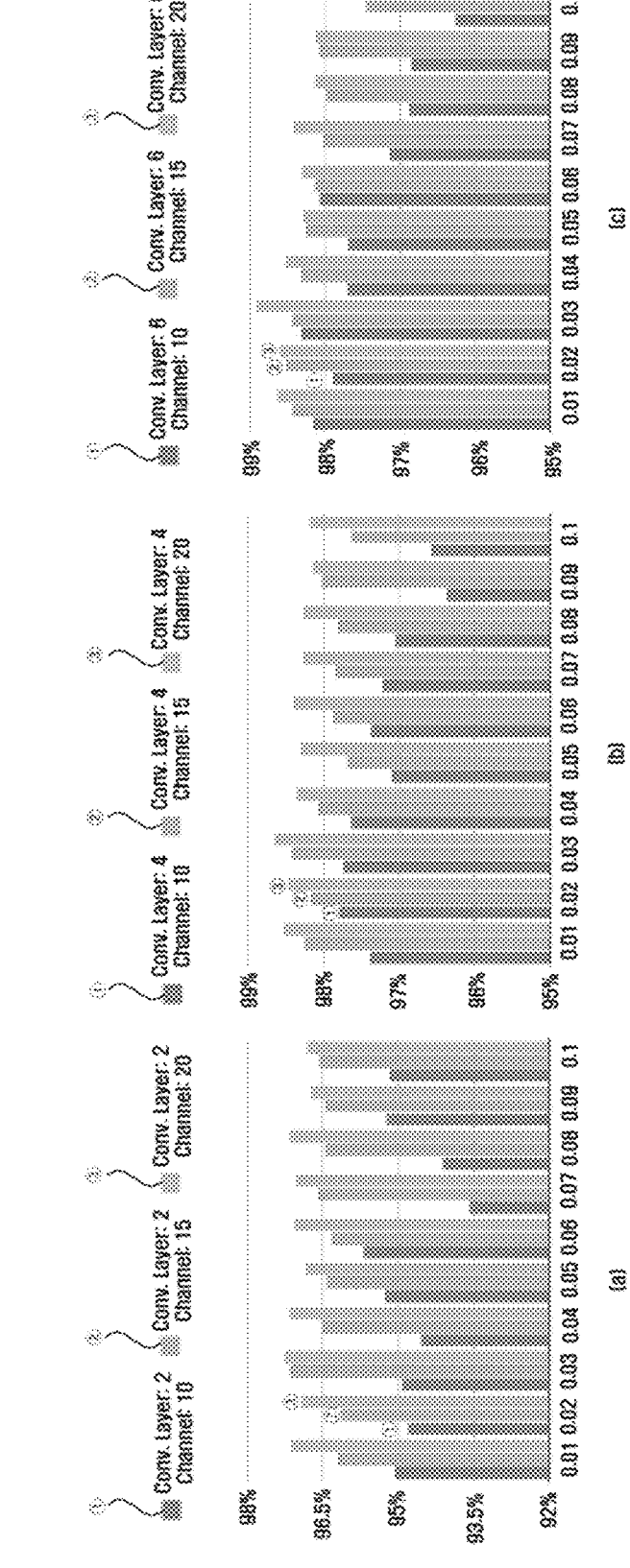
Figure 8:
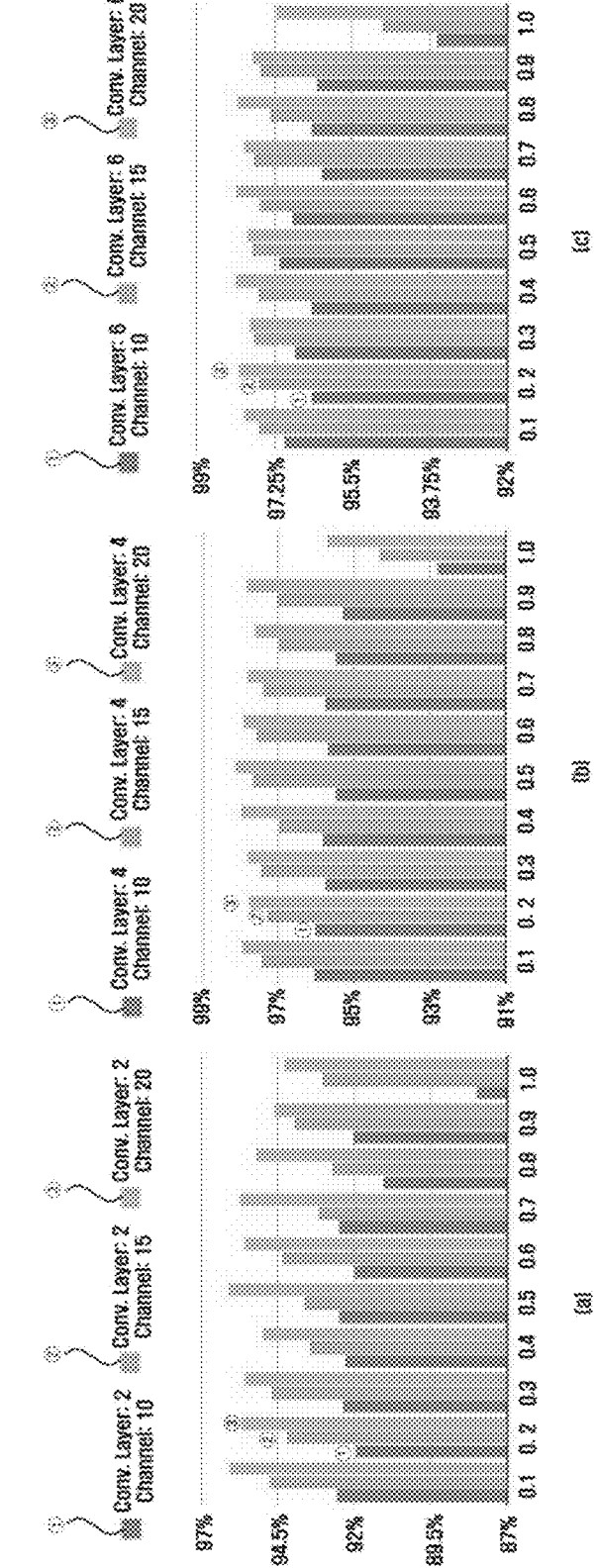
FIGS. 8 and 9 are sets of graphs illustrating an operation of calculating an optimal momentum shown in FIG. 3.
Figure 9:
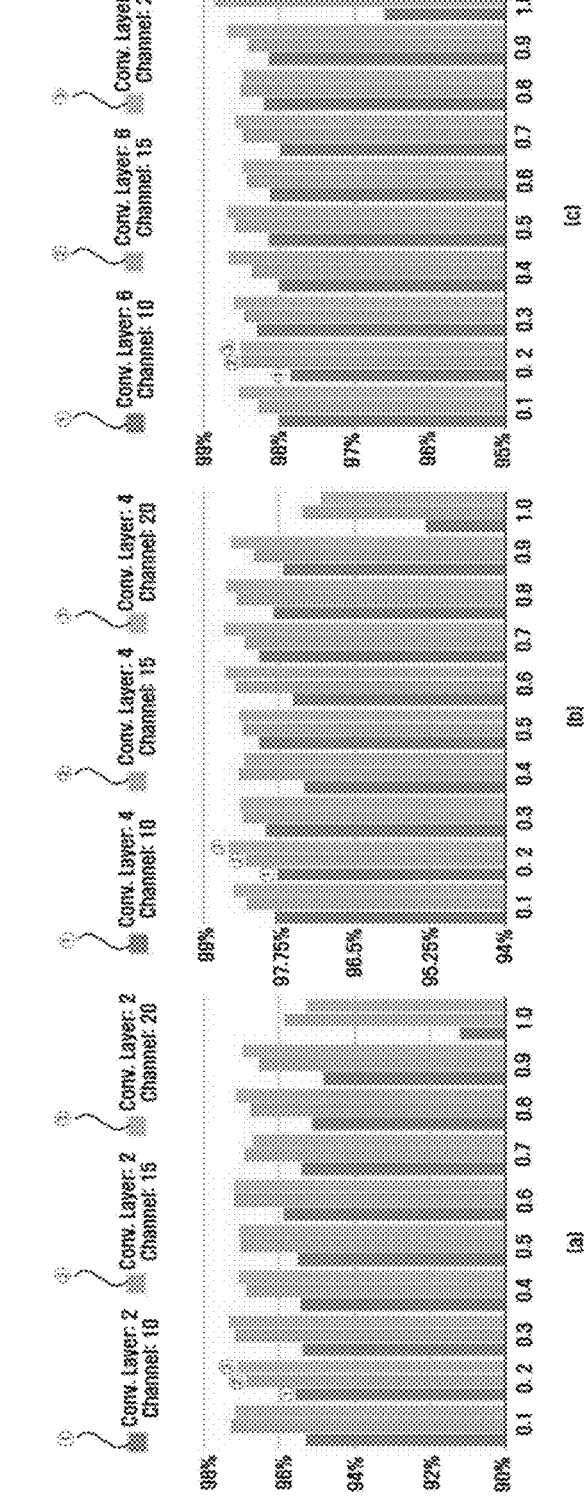
Figure 10:
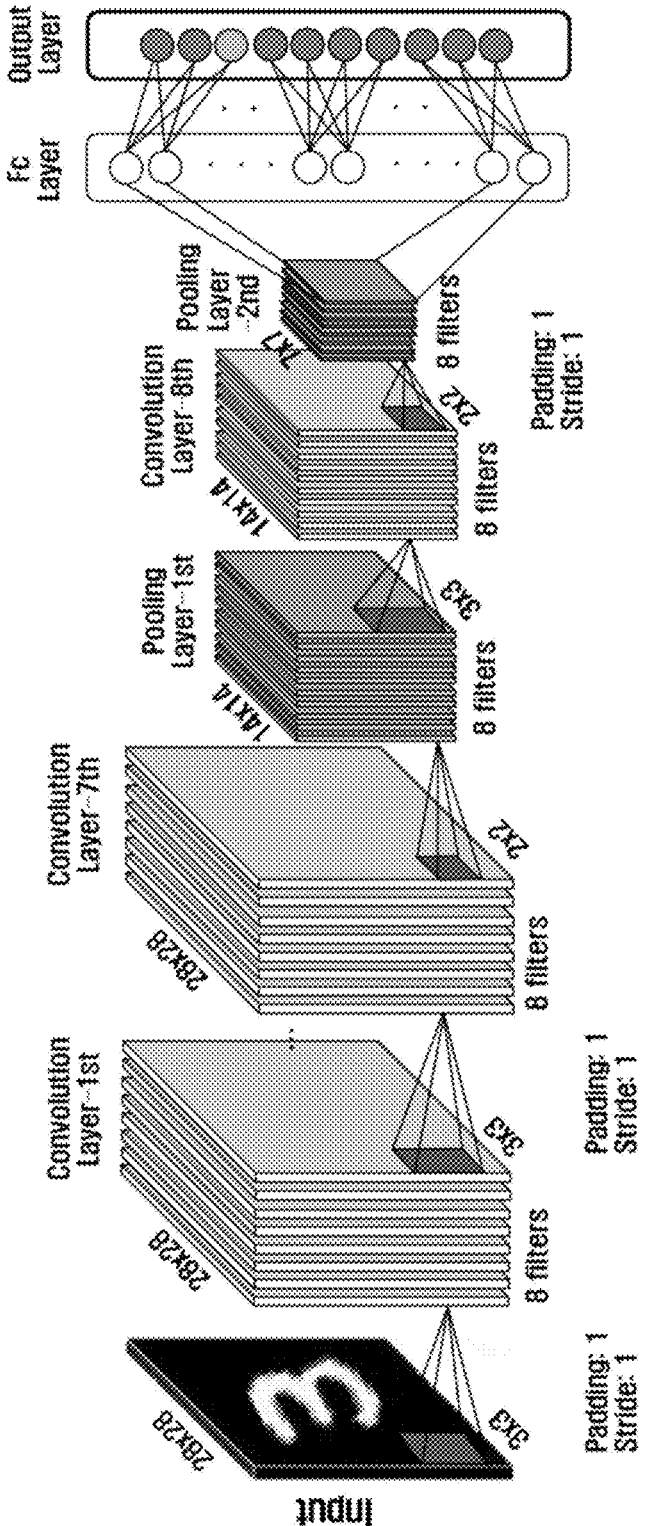
FIGS. 10 to 12 are diagrams illustrating an operation of determining whether there is batch normalization and whether there is a pooling layer shown in FIG. 3.
Figure 11:
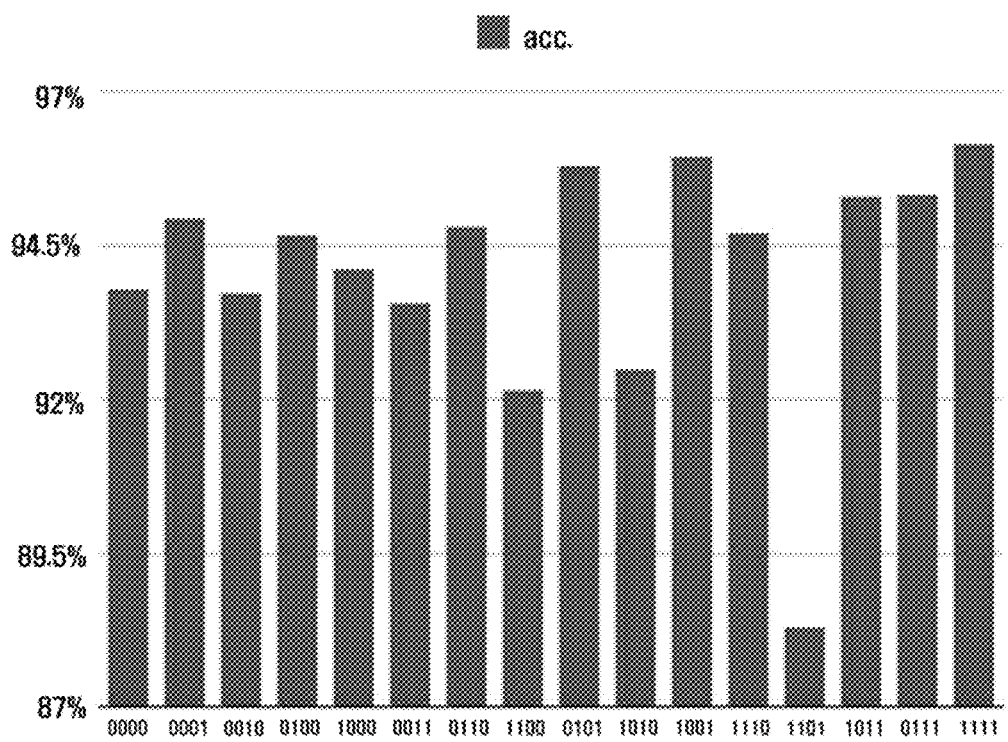
Figure 12:
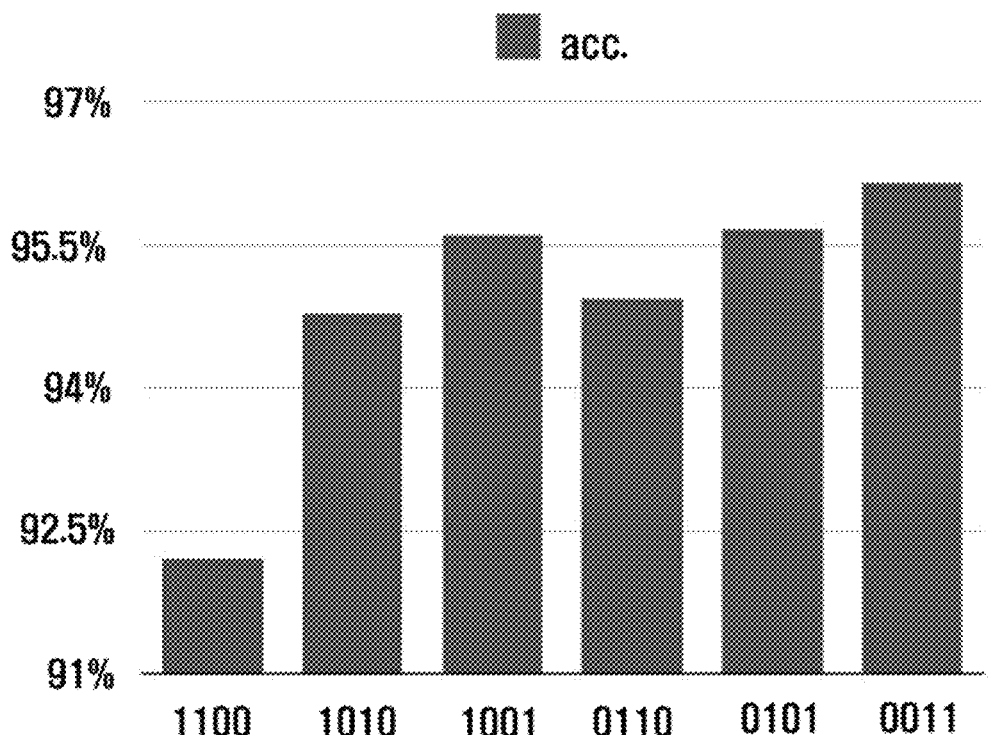
Figure 13:
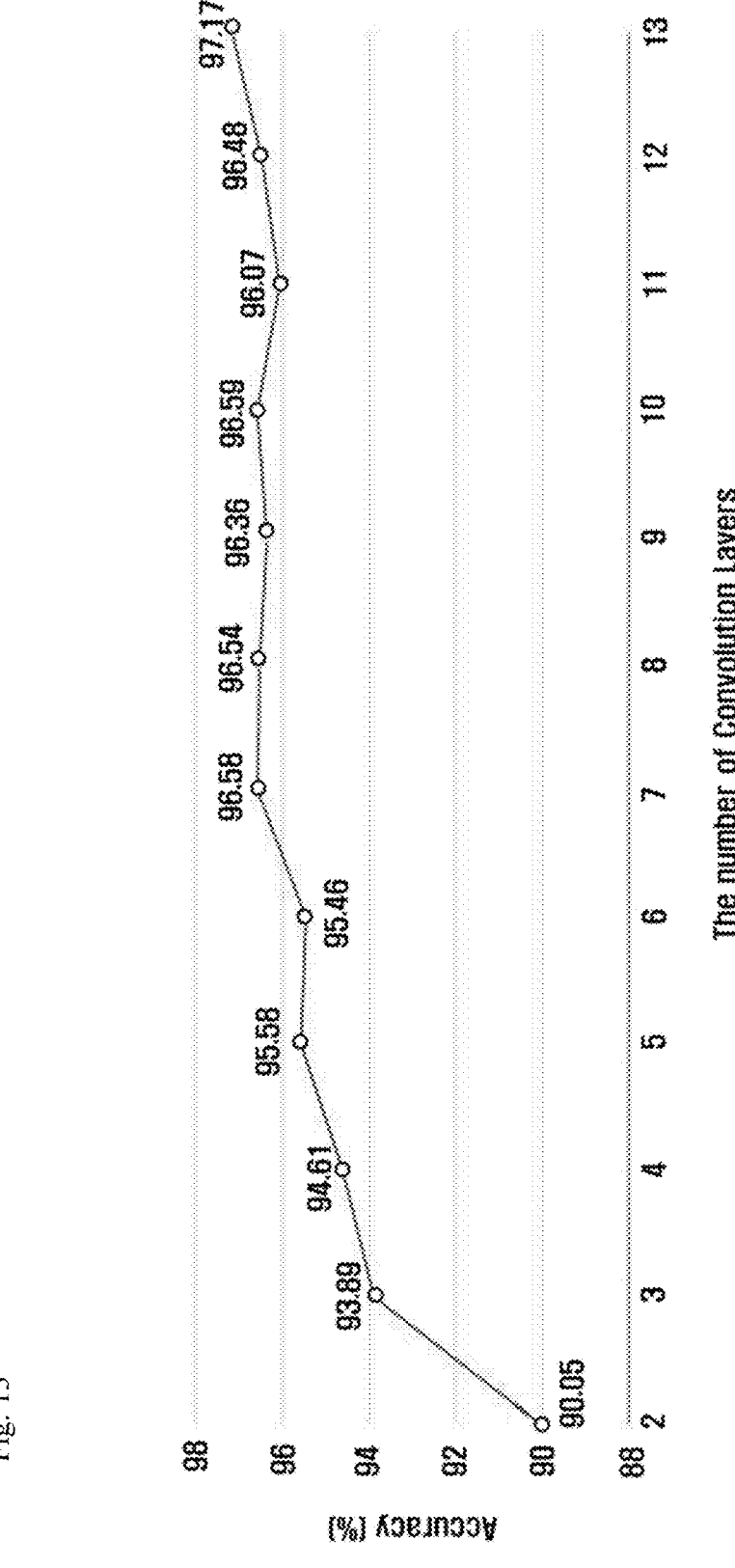
FIGS. 13 and 14 are graphs illustrating an operation of calculating a minimum channel size shown in FIG. 2.
Figure 14:
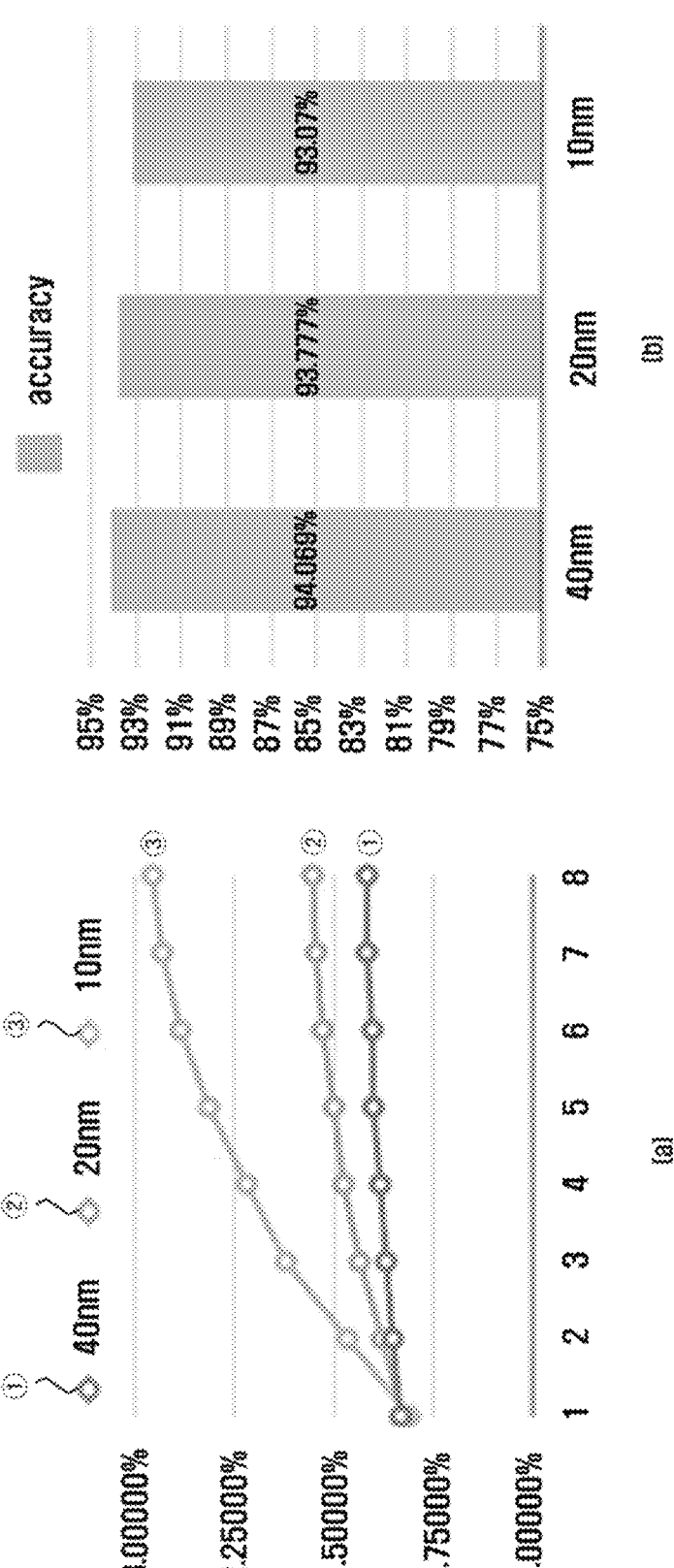

FIG. 2 is a flowchart illustrating a method of optimizing layers of a 3D RRAM device using artificial intelligence technology according to an embodiment of the present disclosure. FIG. 3 is a flowchart illustrating an operation of acquiring an optimal parameter shown in FIG. 2. FIGS. 4 and 5 are sets of graphs illustrating a method of calculating an optimal algorithm combination shown in FIG. 3. FIGS. 6 and 7 are sets of graphs illustrating a method of calculating an optimal learning rate shown in FIG. 3. FIGS. 8 and 9 are sets of graphs illustrating a method of calculating an optimal momentum shown in FIG. 3. FIGS. 10 to 12 are diagrams illustrating an operation of determining whether there is batch normalization and whether there is a pooling layer shown in FIG. 3. FIGS. 13 and 14 are graphs illustrating a method of calculating a minimum channel size shown in FIG. 2. FIG. is a diagram illustrating a method of optimizing layers of an RRAM having a minimum deviation shown in FIG. 2. Although the method of optimizing layers of a 3D RRAM device using artificial intelligence technology is performed under coded conditions, the present disclosure is not limited thereto.

Also, the method may be basically performed 100 times for 100 epochs under various conditions of a kernel size, a channel size, and a convolutional layer, but the present disclosure is not limited thereto.

| Kernel Size | Convolutional Layer | Channel Size |
|---|---|---|
| 3 × 3 | 2 | 10 |
| | | 15 |
| | | 20 |
| | 4 | 10 |
| | | 15 |
| | | 20 |
| | 6 | 10 |
| | | 15 |
| | | 20 |
| 5 × 5 | 2 | 10 |
| | | 15 |
| | | 20 |
| | 4 | 10 |
| | | 15 |
| | | 20 |
| | 6 | 10 |
| | | 15 |
| | | 20 |

First, as shown in FIG. 2, the neural network device 10 may classify BNN parameters of a BNN model as physical parameters and hyperparameters (S10).

Here, the physical parameters may include, but are not limited to, the number of convolutional layers, a channel (filter) size, a kernel size, whether there is batch normalization, and whether there is a pooling layer.

Also, the hyperparameters may include an optimizer, a learning rate, and momentum. However, the hyperparameters are not limited thereto and may include the number of hidden units, a minibatch size, and a learning-rate decay rate. Subsequently, the neural network device 10 may acquire an optimal parameter using the physical parameters and the hyperparameters (S20).

Specifically, as shown in FIG. 3, the neural network device 10 may calculate an optimal algorithm using an algorithm of the optimizer included in the hyperparameters (S100).

Here, the algorithm of the optimizer may include a batch gradient descent algorithm in which overall data is taken into consideration to calculate an error, a stochastic gradient descent (SGD) algorithm in which computation is performed on only one piece of randomly selected data rather than overall data to adjust a parameter value, a gradient descent algorithm in which computation is performed on only a determined amount to adjust a parameter value, a mini-batch gradient descent algorithm which is faster than computation of entire data and stabler than SGD, a momentum algorithm in which the law of physics called inertia applies, an adaptive gradients (AdaGrad) algorithm in which different learning rates are applied to parameters, a root mean squared propagation (RMSprop) algorithm which overcomes a drawback of the AdaGrad algorithm that a learning rate decreases, and an adaptive moment estimation (Adam) algorithm having merits of both the RMSprop and momentum algorithms.

In the present embodiment, to calculate an optimal algorithm, the neural network device 10 may calculate an optimal algorithm combination using the SGD algorithm which adjusts weights for randomly extracted data rather than all data despite low optimal accuracy and thus has an increased rate and the Adam algorithm having merits of both the RMSprop algorithm and the momentum algorithm. Specifically, the neural network device 10 may calculate an optimal algorithm combination in which a ratio of the Adam algorithm to the SGD algorithm is 3:7 when a kernel size is 3×3, and may calculate an optimal algorithm combination in which a ratio of the Adam algorithm to the SGD algorithm is 6:4 when a kernel size is 5×5.

In other words, the neural network device 10 may calculate an optimal ratio between the Adam algorithm and the SGD algorithm. A case in which a ratio of the Adam algorithm is high and a case in which a ratio of the SGD algorithm is high may be compared to calculate an optimal ratio resulting in the highest accuracy.

For example, the neural network device 10 performs computation under a condition that the ratio of the Adam algorithm to the SGD algorithm is 1:9, a condition that the ratio of the Adam algorithm to the SGD algorithm is 2:8, a condition that the ratio of the Adam algorithm to the SGD algorithm is 3:7, a condition that the ratio of the Adam algorithm to the SGD algorithm is 4:6, a condition that the ratio of the Adam algorithm to the SGD algorithm is 5:5, a condition that the ratio of the Adam algorithm to the SGD algorithm is 6:4, a condition that the ratio of the Adam algorithm to the SGD algorithm is 7:3, a condition that the ratio of the Adam algorithm to the SGD algorithm is 8:2, and a condition that the ratio of the Adam algorithm to the SGD algorithm is 9:1. As a result, the neural network device 10 may calculate an optimal algorithm combination in which the ratio of the Adam algorithm to the SGD algorithm is 3:7 when a kernel size is 3×3 and the ratio of the Adam algorithm to the SGD algorithm is 6:4 when a kernel size is 5×5.

Specifically, referring to FIG. 4, the highest accuracy is seen when the ratio of the Adam algorithm to the SGD algorithm is 3:7 among the accuracy according to a change in channel size when a kernel size is 3×3 and the number of convolutional layers is two (see FIG. 4A), the accuracy according to a change in channel size when the number of convolutional layers is four (see FIG. 4B), and the accuracy according to a change in channel size when the number of convolutional layers is six (see FIG. 4C).

Also, referring to FIG. 5, the highest accuracy is seen when the ratio of the Adam algorithm to the SGD algorithm is 3:7 among the accuracy according to a change in channel size when a kernel size is 5×5 and the number of convolutional layers is two (see FIG. 5A), the accuracy according to a change in channel size when the number of convolutional layers is four (see FIG. 5B), and the accuracy according to a change in channel size when the number of convolutional layers is six (see FIG. 5C).

Subsequently, the neural network device 10 may calculate an optimal learning rate for adjusting weights in BNN and an intensity of a kernel update using the learning rate included in the hyperparameters (S110). In other words, the neural network device 10 may calculate the same optimal learning rate of 0.03 when the kernel size is 3×3 and the kernel size is 5×5.

For example, the neural network device 10 may calculate the optimal learning rate of 0.03 having an accuracy of 99% by comparatively analyzing learning rates from 0.01 to 0.1 indicating how much learning is necessary at one time.

Specifically, referring to FIG. 6, the highest accuracy is seen when the learning rate is 0.03 among the accuracy according to a change in channel size when a kernel size is 3×3 and the number of convolutional layers is two (see FIG. 6A), the accuracy according to a change in channel size when the number of convolutional layers is four (see FIG. 6B), and the accuracy according to a change in channel size when the number of convolutional layers is six (see FIG. 6C).

Also, referring to FIG. 7, the highest accuracy is seen when the learning rate is 0.03 among the accuracy according to a change in channel size when a kernel size is 5×5 and the number of convolutional layers is two (see FIG. 7A), the accuracy according to a change in channel size when the number of convolutional layers is four (see FIG. 7B), and the accuracy according to a change in channel size when the number of convolutional layers is six (see FIG. 7C).

Subsequently, the neural network device 10 may calculate an optimal momentum by considering a momentum value in the BNN using the momentum included in the hyperparameters (S120). In other words, the neural network device may calculate an optimal momentum of 0.5 when a kernel size is 3×3 and calculate an optimal momentum of 0.6 when a kernel size is 5×5.

For example, to calculate an optimal momentum value for reducing a training time, the neural network device 10 may calculate an optimal momentum by considering different momentum values from 0.1 to 1.0, that is, a momentum of 0.5 when a kernel size is 3×3, and a momentum of 0.6 when a kernel size is 5×5. Specifically, referring to FIG. 8, the highest accuracy is seen when the momentum is 0.5 among the accuracy according to a change in channel size when a kernel size is 3×3 and the number of convolutional layers is two (see FIG. 8A), the accuracy according to a change in channel size when the number of convolutional layers is four (see FIG. 8B), and the accuracy according to a change in channel size when the number of convolutional layers is six (see FIG. 8C).

Also, referring to FIG. 9, the highest accuracy is seen when the momentum is 0.6 among the accuracy according to a change in channel size when a kernel size is and the number of convolutional layers is two (see FIG. 9A), the accuracy according to a change in channel size when the number of convolutional layers is four (see FIG. 9B), and the accuracy according to a change in channel size when the number of convolutional layers is six (see FIG. 9C).

Subsequently, the neural network device 10 may determine whether there is batch normalization (S130). In other words, the neural network device 10 may determine whether batch normalization is necessary in a convolutional layer.

For example, referring to FIG. 10, when the number of convolutional layers is four, a channel size is 9, and a kernel size 3×3, batch normalization may be required in each of the convolutional layers.

Here, batch normalization may be calculated according to Equation 1 below. Elements having scalar values may be independently calculated for normalization using Equation 1 for an n-dimensional input x={x(1), x(2), . . . , x(n)}.

$$\hat{x}^{(k)} = \frac{x^{(k)} - \mathbb{E}\left[x^{(k)}\right]}{\sqrt{\text{Var}\left[x^{(k)}\right]}} \qquad \text{[Equation 1]}$$

When batch normalization is not included in each of the convolutional layers, referring to FIG. 11, there may be an accuracy difference of 8%, but the present disclosure is not limited thereto.

Subsequently, the neural network device 10 may determine whether there is a pooling layer (S140). In other words, the neural network device 10 may determine whether there is a pooling layer in the convolutional layers.

For example, referring to FIG. 10, when the number of convolutional layers is four, a channel size is 9, and a kernel size is 3×3, pooling layers may be positioned in the last two of the convolutional layers.

In other words, when pooling layers are positioned in the last two of the convolutional layers, referring to FIG. 12, the highest accuracy is seen.

Meanwhile, operation S130 of determining whether there is batch normalization may be performed after operation S140 of determining whether there is a pooling layer. However, the present disclosure is not limited thereto, and operation S130 and operation S140 may be performed simultaneously.

Subsequently, the neural network device 10 may calculate a minimum channel size of the BNN model using the optimal parameter (S30). In other words, the neural network device 10 may determine accuracy of a minimum channel size and calculate a minimum channel size corresponding thereto.

For example, the neural network device 10 may calculate a minimum channel size by reducing a channel size of 9 one by one. Here, the channel size may not be related to the number of convolutional layers.

Specifically, referring to FIG. 13, when a minimum channel size is 8 and a kernel size is 3×3, accuracy is 96% or higher. In other words, it is possible to minimize layers of the 3D RRAM while maintaining or increasing accuracy in the BNN model.

Also, the neural network device 10 may determine accuracy in a minimum channel size by applying a layer-specific error rate according to the minimum channel size.

For example, referring to FIG. 14, when a minimum channel size is 8 and a kernel size is 3×3, accuracy may be 94.069% at a 40 nm node, accuracy may be 93.777% at a 20 nm node, and accuracy may be 93.07% at a 10 nm node.

Finally, the neural network device 10 may optimize layers of the RRAM having a minimum deviation using the minimum channel size (S40).

Figure 15:
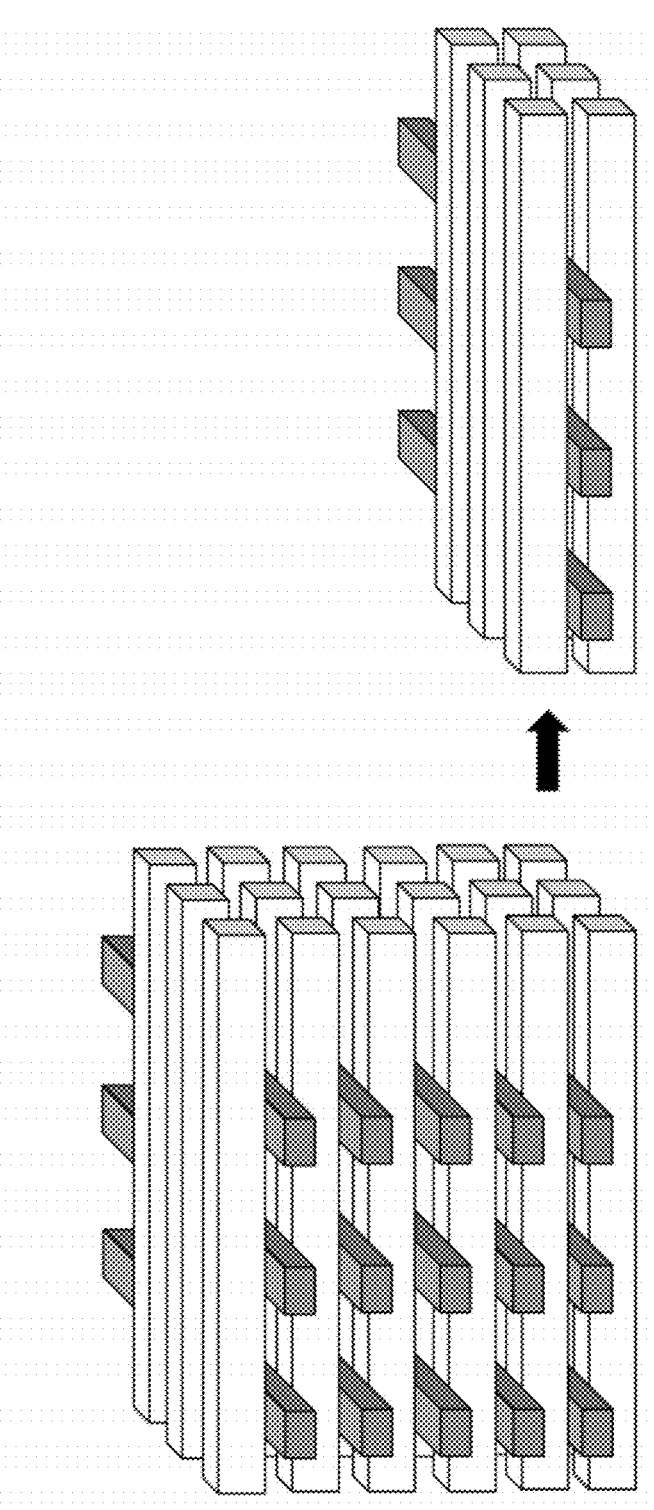
FIG. 15 is a diagram illustrating an operation of optimizing layers of an RRAM having a minimum deviation shown in FIG. 2.

Referring to FIG. 15, the neural network device 10 may reduce a channel size of 50 by 80% or more while maintaining accuracy, thereby optimizing the channel size to 8.

The neural network device 10 may include any of various types of portable electronic devices for performing the method of optimizing layers of a 3D RRAM device using artificial intelligence technology. For example, the neural network device 10 may include, but is not limited to, any of various terminals, such as a smartphone, a personal digital assistant (PDA), a tablet, a wearable device (e.g., a smart watch, smart glasses, a head mounted display (HMD), etc.), and various Internet of things (IoT) terminals, as a smart device.

Figure 16:
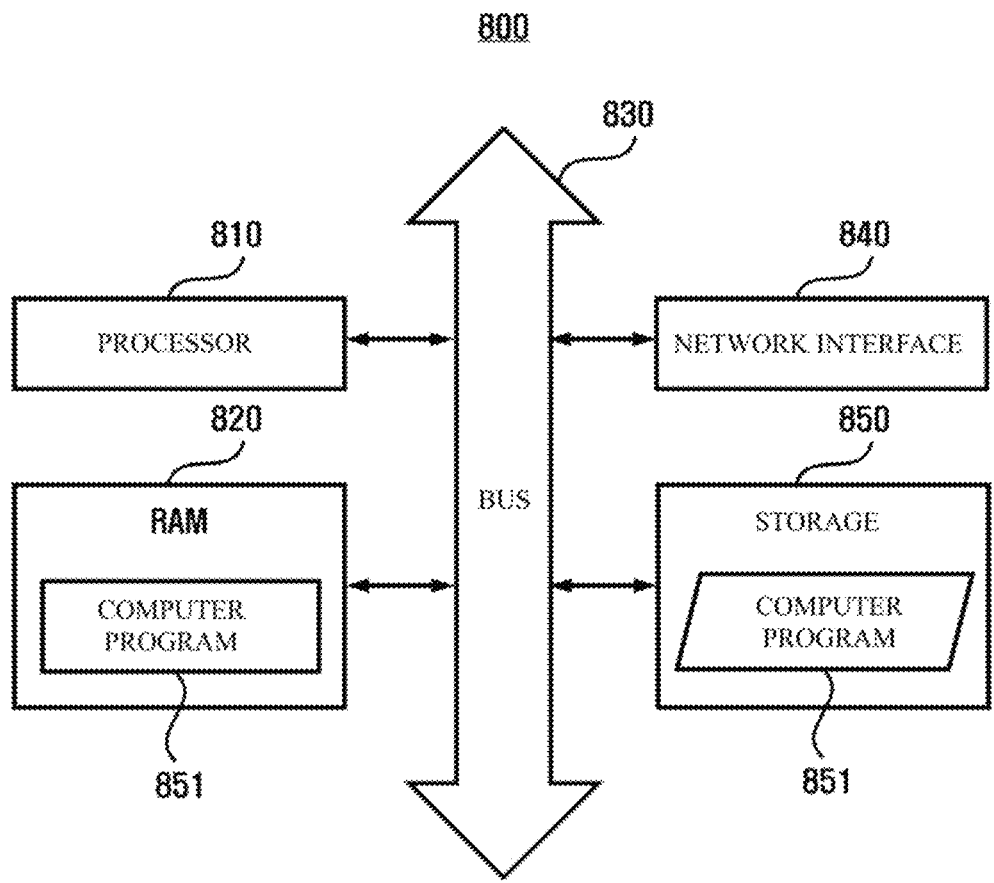
FIG. 16 is a hardware configuration diagram of a computing device for implementing a neural network device shown in FIG. 1.

FIG. 16 is a hardware configuration diagram of an exemplary computing device for implementing the neural network device 10.

Referring to FIG. 16, a computing device 800 may include at least one processor 810, a storage 850 storing a computer program 851, a memory 820 to which the computer program 851 executed by the processor 810 is loaded, a bus 830, and a network interface 840. However, FIG. 16 only shows components related to embodiments of the present disclosure. Therefore, it will be appreciated by those skilled in the technical field to which the present disclosure pertains that general-use components other than those shown in FIG. 16 may be further included.

The processor 810 controls overall operations of each component of the computing device 800. The processor 810 may include a central processing unit (CPU), a microprocessor unit (MPU), a microcontroller unit (MCU), a graphic processing unit (GPU), or any type of processor well known in the technical field of the present disclosure. Also, the processor 810 may perform computation for at least one computer program for performing the method of optimizing layers of a 3D RRAM device using artificial intelligence technology according to an embodiment of the present disclosure. The computing device 800 may include at least one processor.

The memory 820 stores data supporting various functions of the computing device 800. The memory 820 stores multiple computer programs (apps, application programs, or application software) running on the computing device 800 and one or more of data, instructions, and information for operation of the computing device 800. At least some of the computer programs may be downloaded from an external device (not shown). Also, at least some of the computer programs may be present in the computing device 800 for basic functions (e.g., message receiving and message sending) of the computing device 800 from when the computing device 800 is shipped.

Meanwhile, the memory 820 may load the at least one computer program 851 from the storage 850 to perform the method of optimizing layers of a 3D RRAM device using artificial intelligence technology according to an embodiment of the present disclosure. In FIG. 16, a RAM is shown as an example of the memory 820.

The bus 830 provides a communication function between the components of the computing device 800. The bus 830 may be implemented as any of various types of buses such as an address bus, a data bus, a control bus, etc.

The network interface 840 supports wired or wireless Internet communication of the computing device 800. Also, the network interface 840 may support various communication methods other than Internet communication. To this end, the network interface 840 may include a communication module well known the technical field of the present disclosure.

The storage 850 may non-temporarily store the at least one computer program 851. The storage 850 may include a non-volatile memory, such as a read-only memory (ROM), an erasable programmable ROM (EPROM), an electrically erasable programmable ROM (EEPROM), a flash memory, etc., a hard disk, a removable disk, or any type of computer-readable recording medium well known in the technical field to which the present disclosure pertains.

In addition to the components shown in FIG. 16, the computing device 800 may include an input unit and an output unit.

The input unit may include a camera for receiving an image signal, a microphone for receiving an audio signal, and a user input unit for receiving information from a user. The user input unit may include at least one of a touch key and a mechanical key. Image data collected through the camera or the audio signal received through the microphone may be analyzed and processed by a control command of the user.

The output unit is intended to output command process results visually, audibly, or tactually and may include a display unit, a light output unit, a speaker, and a haptic output unit.

Operations of methods or algorithms described in connection with embodiments of the present disclosure may be directly implemented by hardware, implemented by software modules executed by hardware, or implemented by a combination of hardware and software modules. The software modules may be present on a random-access memory (RAM), a ROM, an EPROM, an EEPROM, a flash memory, a hard disk, a removable disk, a compact disc (CD)-ROM, or any type of computer-readable recording medium well known in the technical field to which the present disclosure pertains.

Although embodiments of the present disclosure have been described with reference to the accompanying drawings, it will be understood by those skilled in the technical field to which the present disclosure pertains that the present disclosure may be implemented in other specific forms without departing from the technical spirit or essential features thereof. Therefore, the above-described embodiments should be construed as illustrative rather than restrictive in all aspects.

INDUSTRIAL APPLICABILITY

The disclosed technology can be applied to a neural network, a neural network device, and a neural network system which use a three-dimensional (3D) resistive random-access memory (RRAM).

The invention claimed is:

1. A method of optimizing layers of a three-dimensional (3D) resistive random-access memory (RRAM) device using artificial intelligence technology through a neural network device, the method comprising:
   classifying, by the neural network device, binary neural network (BNN) parameters of a BNN model as physical parameters and hyperparameters;
   acquiring, by the neural network device, an optimal parameter using the physical parameters and the hyperparameters; and
   calculating, by the neural network device, a minimum channel size of the BNN model using the optimal parameter.

2. The method of claim 1, wherein the physical parameters include a number of convolutional layers, a channel (filter) size, a kernel size, whether there is batch normalization, and whether there is a pooling layer, and the hyperparameters include an optimizer, a learning rate, and a momentum.

3. The method of claim 2, wherein the optimizer includes at least one of a batch gradient descent algorithm, a stochastic gradient descent (SGD) algorithm, a gradient descent algorithm, a mini-batch gradient descent algorithm, a momentum algorithm, an adaptive gradients (AdaGrad) algorithm, a root mean squared propagation (RMSprop) algorithm, and an adaptive moment estimation (Adam) algorithm.

4. The method of claim 3, wherein the acquiring of the optimal parameter comprises:

calculating an optimal algorithm using the algorithm of the optimizer included in the hyperparameters;

calculating an optimal learning rate for adjusting weights in BNN and an intensity of a kernel update using the learning rate included in the hyperparameters; and calculating an optimal momentum by considering a momentum value in the BNN using the momentum included in the hyperparameters.

5. The method of claim 4, wherein the calculating of the optimal algorithm comprises:

calculating an optimal algorithm combination of one or more algorithms included in the optimizer; and calculating a ratio of the optimal algorithm combination.

6. The method of claim 5, wherein, in the optimal algorithm, a ratio of the Adam algorithm to the SGD algorithm is 3:7 when the kernel size is 3×3, and a ratio of the Adam algorithm to the SGD algorithm is 6:4 when the kernel size is 5×5.

7. The method of claim 4, wherein an optimal learning rate of a case of the kernel size being 3×3 and an optimal learning rate of a case of the kernel size being are the same as 0.03.

8. The method of claim 4, wherein the optimal momentum has a momentum value of 0.5 when the kernel size is 3×3, and a momentum value of 0.6 when the kernel size is 5×5.

9. The method of claim 4, wherein the acquiring of the optimal parameter comprises determining whether there is batch normalization and whether there are pooling layers.

10. The method of claim 9, wherein batch normalization is included in each of the convolutional layers when the number of convolutional layers is 4, the channel size is 9, and the kernel size is 3×3.

11. The method of claim 10, wherein, when batch normalization is not included in each of the convolutional layers, there is an accuracy difference of 8%.

12. The method of claim 10, wherein batch normalization is performed according to [Equation 1], $$\hat{x}^{(k)} = \frac{x^{(k)} - \mathbb{E}\left[x^{(k)}\right]}{\sqrt{\mathrm{Var}\left[x^{(k)}\right]}}.$$

[Equation 1]

13. The method of claim 9, wherein, when the number of convolutional layers is 4, the channel size is 9, and the kernel size is 3×3, the pooling layers are positioned in the last two of the convolutional layers.

14. The method of claim 1, wherein the calculating of the minimum channel size comprises determining accuracy of the minimum channel size.

15. The method of claim 14, wherein, when the minimum channel size is 8 and the kernel size is 3×3, the accuracy is 96% or higher.

16. The method of claim 15, wherein the calculating of the minimum channel size further comprises determining the accuracy of the minimum channel size by applying a layer-specific error rate according to the minimum channel size.

17. The method of claim 16, wherein, when the minimum channel size is 8 and the kernel size is 3×3, accuracy at a 40 nm node is 94.069%, accuracy at a 20 nm node is 93.777%, and accuracy at a 10 nm node is 93.07%.

18. The method of claim 1, further comprising optimizing, by the neural network device, an RRAM layer having a minimum deviation using the minimum channel size.

19. A neural network system for optimizing layers of a three-dimensional (3D) resistive random-access memory (RRAM) device using artificial intelligence technology which performs the method of claim 1 through a neural network device.

20. A computer program stored in a computer-readable recording medium to perform the method of claim 1 in combination with a computer which is hardware.

* * * * *